United States Patent [19]

McNamara et al.

[11] Patent Number: 5,974,139
[45] Date of Patent: Oct. 26, 1999

[54] LINE ISOLATION DEVICE FOR ASYMMETRICAL DIGITAL SUBSCRIBER LINE

[75] Inventors: W. J. McNamara, Birmingham; Gary J. Tennyson, Alabaster; D. A. Wilmont, Birmingham, all of Ala.

[73] Assignee: BellSouth Corporation, Atlanta, Ga.

[21] Appl. No.: 08/812,296

[22] Filed: Mar. 7, 1997

[51] Int. Cl.$^6$ .................................................. H04M 1/00
[52] U.S. Cl. ........................................ 379/399; 379/397
[58] Field of Search .................................. 379/399, 419, 379/387, 397, 93.5, 93.07, 93.1; 455/3.1, 4.2, 6.3, 5.1; 333/17.1, 201, 202

[56] References Cited

U.S. PATENT DOCUMENTS

| | | |
|---|---|---|
| 5,027,426 | 6/1991 | Chiocca, Jr. . |
| 5,369,666 | 11/1994 | Folwell et al. . |
| 5,408,260 | 4/1995 | Arnon . |
| 5,410,343 | 4/1995 | Coddington et al. . |
| 5,440,335 | 8/1995 | Beveridge . |

(List continued on next page.)

OTHER PUBLICATIONS

Cook, John, "Telephony Transmission and Splitters, Passive and Active," *American National Standards Institute*, Telecommunications Committee, T1E1.4/94–043 (14 pages, Feb. 14–18, 1994).

Rauschmayer, Dennis J., "Effects of a Distributed POTS Splitter Topology on ADSL Line Transfer Functions," *American National Standards Institute*, T1E1.4 Technical Subcommittee Report, T1E1.4/96–167 (pp. 1–9, Jul. 22, 1996).

Roberts, Rick, et al., "ADSL POTS LPF Placement," *American National Standards Institute* Work Group Report, T1E1.4/96–162 (7 pages, Jul., 1996).

"For Telecommunications—Interface Between Carriers and Customer Installations—Analog Voicegrade Switched Access Lines Using Loop–Start and Ground–Start Signaling," *American National Standards Institute* ANSI T1.401–1993 (pp. 1–74).

"For Telecommunications—Network and Customer Installation Interfaces—Asymmetric Digital Subscriber Line (ADSL) Metallic Interface," *American National Standards Institute Standard* ANSI T1.413–1995 (pp. 1–170).

"IEEE Standard Methods and Equipment for Measuring the Transmission Characteristics of Analog Voice Frequency Circuits," *The Institute of Electrical and Electronics Engineers, Inc.*, IEEE Std 743–1984 (pp. 11–60).

*Primary Examiner*—Jack Chiang
*Attorney, Agent, or Firm*—James L. Ewing, IV; Geoff L. Sutcliffe; Kilpatrick Stockton LLP

[57] ABSTRACT

A line isolation device (LID) for use in an ADSL system provides a single low pass filter that filters out the higher band ADSL signals for all of the Plain Old Telephone Services (POTS) terminal devices within a customer's premises. The LID may be easily added to an existing ADSL system by routing signals from a customer bridge through the LID. The LID has a low pass filter for removing the ADSL signals and also has a bypass path for carrying unfiltered ADSL and POTS signals to an ADSL transceiver unit. The filtered POTS signals are supplied back to the customer bridge and to binding posts on the customer bridge where all POTS terminal devices receive their POTS signals. The re-routing of the signals within the NID through the LID can be easily accomplished by disconnecting a testing jack on the customer bridge and routing the signals through the LID. Alternatively, the customer bridge may be completely removed from the NID and replaced with a customer bridge having an integral low pass filter. As a further alternative, an additional customer bridge having the low pass filter may be installed into an empty receptacle within the NID and appropriately connected to the existing customer bridge. The low pass filter is preferably a four-pole filter to provide a sufficient amount of attenuation at frequencies above the voiceband.

27 Claims, 4 Drawing Sheets

U.S. PATENT DOCUMENTS

| | | |
|---|---|---|
| 5,461,616 | 10/1995 | Suzuki . |
| 5,469,495 | 11/1995 | Beveridge . |
| 5,488,413 | 1/1996 | Elder et al. . |
| 5,512,898 | 4/1996 | Norsworthy et al. . |
| 5,519,731 | 5/1996 | Cioffi . |
| 5,528,630 | 6/1996 | Ashley et al. . |
| 5,534,912 | 7/1996 | Kostreski . |
| 5,548,255 | 8/1996 | Spielman . |
| 5,559,858 | 9/1996 | Beveridge . |
| 5,561,424 | 10/1996 | Norsworthy et al. . |
| 5,848,150 | 12/1998 | Bingel ..................................... 379/399 |

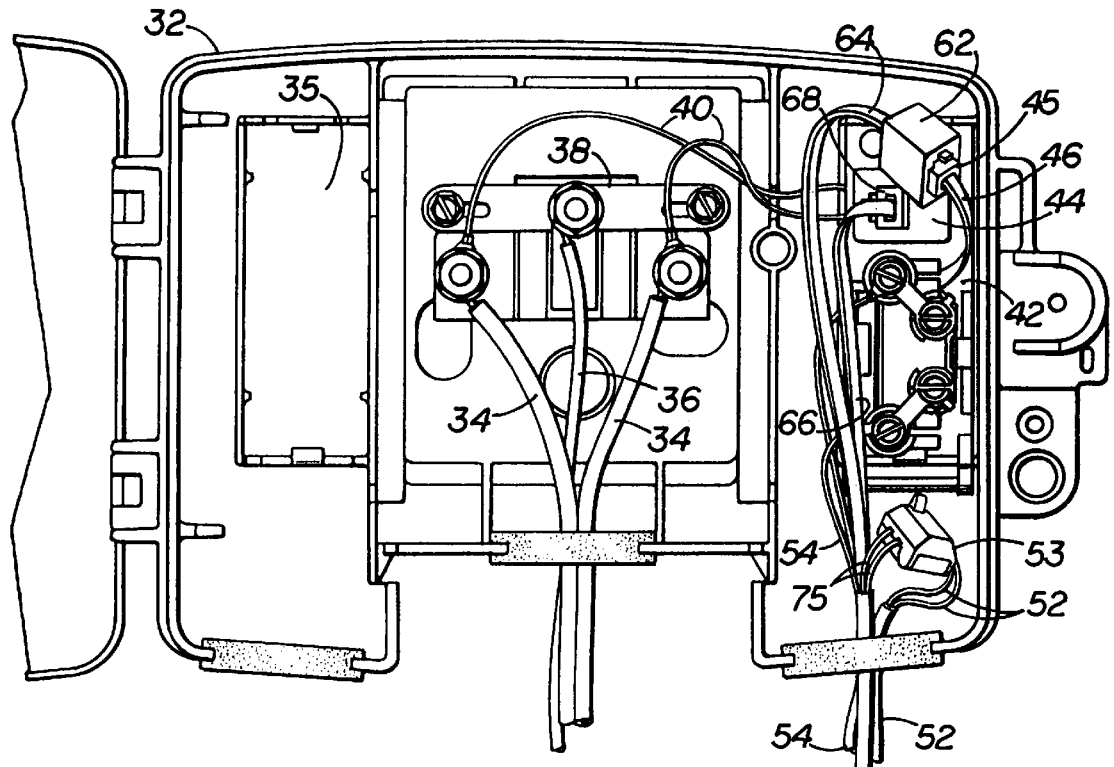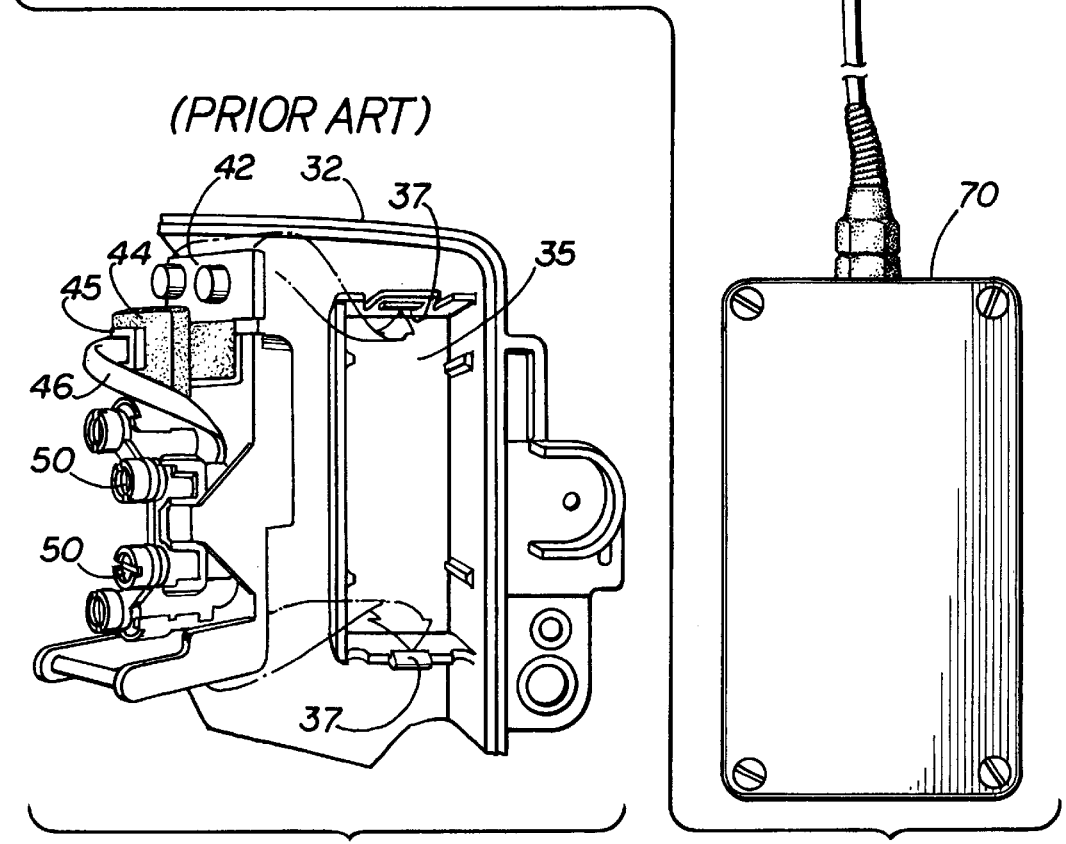
FIG 2B (PRIOR ART)
FIG 3

LINE ISOLATION DEVICE FOR ASYMMETRICAL DIGITAL SUBSCRIBER LINE

FIELD OF THE INVENTION

The present invention relates generally to a line isolation device and, more particularly, to a line isolation device for use in an Asymmetrical Digital Subscriber Line (ADSL) system. The line isolation device provides low-pass filtering for all conventional or so-called plain old telephone services (POTS) terminal devices located within a customer's premises, and it provides a bypass path for the ADSL signals.

BACKGROUND OF THE INVENTION

In general, modems designed for use with conventional telephone lines accommodate relatively low data transmission rates. While current modems can process a high-end bit rate at about 33.6 Kbits/second, they are nonetheless significantly slower than a digital modem, such as one on an ISDN line which can operate at 64 Kbits/second. These rates, unfortunately, remain too low for many desired types of communication, such as full-motion video which requires a minimum of 1.5 Mbits/second for VHS quality using MPEG-1 (Motion Pictures Expert Group) compression and 3 to 6 Mbits/second for broadcast quality using MPEG-2 compression.

A recently pronounced standard in telecommunications defines an Asymmetrical Digital Subscriber Line (ADSL) system which executes a high speed transfer of data over a single twisted-wire pair, such as an existing telephone line. In addition to Plain Old Telephone Services (POTS), an ADSL system also permits full-duplex and simplex digital services with data rates from about 1.5 Mbits/second to 7 Mbits/second. An ADSL system uses a spectrum from about 26 kHz to 1.1 MHz for broadband data transmission and leaves the spectrum from about DC to 4 kHz for POTS. An ADSL system provides at least four downstream simplex channels having rates ranging from about 1.5 Mbits/second to 6 Mbits/second and four full duplex channels with rates ranging from about 64 Kbits/second to 640 Kbits/second. An ADSL system is therefore more than capable of providing video-on-demand capability, video conferencing, data file transfer capability and can provide all of this capability simultaneously with POTS. For additional information, reference may be made to American National Standards Institute Standard ANSI-T1.413-1995 which describes an ADSL system and an interface between a telecommunications network and a customer's installation and which is incorporated herein by this reference.

With reference to FIG. 1, a standard ADSL system 10 may comprise an ADSL transceiver unit 12 at a central office (ATU-C) which communicates with an ADSL transceiver unit 14 at a customer premises (ATU-R). The ADSL transceiver unit 12 at the central office receives data from a digital network 15, performs various processing on the data, and transfers the processed data to a splitter 16. The splitter 16 combines the signals from the transceiver unit 12 with signals from a public switched telephone network (PSTN) 18 and transfers the combined signals onto a line 20. At the customer end, a splitter 22 supplies a lower-band set of signals to one or more POTS terminal devices 24 and a higher-band set of signals to the ADSL transceiver unit 14. The ADSL transceiver unit 14 at the customer's end processes the received signals and supplies the processed signals to one or more service modules (SM) 26. The processed data from the ADSL transceiver unit 14 may be supplied directly to the service modules 26 or may be supplied through a customer installation distribution network 28. The network 28 may be any type of network, such as a star or bus network. Reference may be had to ANSI T1.413-1995 for additional information on the ADSL transceiver units 12 and 14 and on other aspects of the ADSL system 10.

One difficulty with ADSL, however, is that the signals supplied to the ADSL transceiver 14 and the signals supplied to the POTS terminal device 24 must be isolated from each other. One reason requiring this isolation is that the POTS terminal device 24, which may be a telephone or other non-linear device, produces inter-modulation harmonics from the ADSL system both in the frequency range of the ADSL signals and in the voice band. Likewise, the ADSL transceiver unit 14 can generate interference with the signals supplied to the POTS terminal device 24. Consequently, some type of filtering must occur between the ADSL transceiver 14 and the POTS terminal devices 24.

The signals supplied to the POTS terminal devices 24 may be isolated from the signals supplied to the ADSL transceiver unit 14 in any one of a multitude of ways. One of these ways is to place a low-pass filter at each POTS terminal device 24 and to place a high-pass filter at either the ADSL transceiver unit 14 or at a network interface device (NID). For instance, the low pass filters may be placed in series between the POTS terminal devices 24 and their connection to a wall jack. These low pass filters would then filter out the higher band ADSL signals and prevent the ADSL signals from interfering with the POTS signals.

The placement of the low-pass filter at each POTS terminal device, however, adversely effects the overall performance of the ADSL system 10. The lines connecting the POTS terminal devices 24 to the low pass filters look like bridge taps to the ADSL line and produce significant losses at the top end of the downstream ADSL band transfer function, such as losses from 5 dB to 15 dB between 400 kHz and 1.1 MHz. The reason for these losses and their effects on the ADSL system 10 are explained in more detail in Dennis J. Rauschmayer, "Effects of a Distributed POTS Splitter Topology on ADSL Line Transfer Functions," American National Standards Institute T1 E1.4 Technical Subcommittee Report T1E1.4/96-167, Jul. 22, 1996, which is incorporated herein by this reference. The placement of low-pass filters at each POTS terminal device 24 is therefore undesirable due to their effects on the ADSL signals.

In contrast to the placement of a low-pass filter at each POTS terminal device 24, the use of a single low pass filter for all POTS terminal devices 24 produces more favorable results. For instance, a comparison between the placement of the low-pass filter at each phone drop versus the placement of the low-pass filter at a split is described in a report by Rick Roberts et al., "ADSL POTS LPF Placement," American National Standards Institute Working Group Report T1E1.4/96-162, July, 1996, which is incorporated herein by this reference. This report suggests that a single low-pass filter at the split is preferred since a distributed low-pass filter at each phone causes several problems, such as a reduced bit rate and reduced reach of the ADSL system, an increase in line driver current, a hybrid/echo cancellation stress, and risk of improper installation or improper network modification. Thus, rather than placing a low-pass filter at each POTS terminal device 24, the ADSL system 10 should preferably have a single low-pass filter installed at the split so that the signals supplied to all of the POTS terminal devices 24 are filtered by this single low pass filter.

A single low-pass filter, however, is not as easily installed at a split as are multiple low-pass filters at each POTS terminal device 24. With multiple low-pass filters, a low-pass filter can be easily incorporated to the telephone network by simply adding a filter between each POTS terminal device 24 and its connection to the customer's telephony wiring, such between the POTS terminal device 24 and a wall jack. The single low-pass filter, on the other hand, must be located at a point along the customer's wiring which is shared by all POTS terminal devices 24 but not at a location which might effect ADSL signals traveling to and from the ADSL transceiver unit 14.

This difficulty in placing a single low pass filter at the split will be explained with reference to FIGS. 2A and 2B, which depict a conventional ADSL installation within a network interface device (NID). In many households and businesses, especially those more recently constructed, a telephone company's wiring is interconnected to the particular customer's telephone wiring within the NID and this interconnect is protected from the elements of the environment within the NID. The point at which the customer's wiring is connected to the telephone company's wiring is termed the customer demarcation point.

With reference to FIG. 2A, a typical NID 32 has a station protector 38 for receiving an incoming service wire 34 and a ground wire 36. Typically, the service wire 34 is attached to the station protector 38 so that a tip signal is supplied to a left post 33A on the protector 38 and a ring signal is supplied to a right post 33B on the protector 38. A pair of leads 40 from a customer bridge 42 couples the tip and ring lines from the station protector 38 to the customer bridge 42 which, in this example, is through an RJ11 female connector 44. The RJ11 female connector 44 defines the customer demarcation point and thus defines the intersection of the telephone company's wiring and that of the customer's telephone wiring. An RJ11 male connector 45 is connected to a cord 46 which couples the tip and ring signals to the binding posts 50 on the customer bridge 42. The RJ11 male connector 45 and the RJ11 female connector 44 provide a convenient testing jack whereby test equipment can be coupled to the RJ11 female connector 44 to ensure that telephony signals are properly reaching the customer's premises. An ADSL interconnect wire 52, connected to posts 50, supplies signals to and from the ADSL transceiver unit 14 and a telephony or POTS interconnect wire 54, also connected to posts 50, supplies telephony signals to and from the POTS terminal devices 24 located within the customer's premises. Although each of the service wire 34, ADSL interconnect wire 52, and POTS interconnect wire 54 has been referred to as a wire, as shown in FIG. 2A, each of these wires 34, 52, and 54 is a line comprised of a pair of conductors for carrying signals.

The customer bridge 42, as shown in FIG. 2B, is a unitary modular structure that is releasably secured to the NID 32 by snapping the bridge 42 within a receptacle 35 formed within the NID 32. The NID 32 has engaging members 37 for engaging edges of the customer bridge 42 so as to secure the bridge 42 to the NID 32. The station protector 38, service wires 34, and grounding wire 36 are each located within a central compartment of the NID 32 and this central compartment is often locked under separate cover so as to prevent any tampering with the wires 34 and 36. Consequently, once the customer bridge 42 has been installed and the leads 40 have been connected to the station protector 38, the customer bridge 42 cannot be removed while the central compartment is locked except by cutting the leads 40.

The installation shown in FIG. 2A lacks any type of filtering for either the POTS signals or the ADSL signals. If the filters for the POTS and ADSL signals are to be considered part of the customer's own telephone wiring, the low pass filter and high pass filter must be placed after the customer demarcation point, which in this example is the RJ11 female connector 44. Additionally, the low pass filter must be located before any branching occurs to separate POTS terminal devices 24 in order for the single low pass filter to provide filtering for all of the POTS terminal devices 24. The filters should also be protected from the elements of the environment to prevent moisture or dirt from damaging the filters.

The filters are not readily placed in its desired position within the customer's telephone wiring if it is to be placed in a protected enclosure and located before any branching to separate POTS terminal devices 24. One possible location for the low pass filter satisfying all of these desires is within the NID 32 itself. The typical NID 32, however, is a fairly small enclosure and does not have much space for any extra components since much of the space is consumed by the customer bridge 42. The low and high pass filters therefore are not readily located within the NID 32.

Another possible location for the filters is external to the NID 32 but before the interconnect wire 54 enters the customer's premises. At such a location, the interconnect wire 54 may have to be cut in order to splice in the low pass filter, which consequently would increase the chance of a service interruption due to a faulty splice. This option is also undesirable since the splice must be encased and protected from the environment, thereby complicating the installation of the low pass filter.

A third general location for the low pass filter is within the customer's premises at a point prior to any branching to the separate POTS terminal devices 24. This option is often plagued with problems since the customer's wiring is usually completely hidden behind a wall or floor. Simply locating the wiring behind the wall or underneath the floor may be quite difficult and, even if the wiring is found, the wall or floor may have to be partially removed to access the wiring, which just presents the customer with the additional task of repairing the wall or floor. The placement of the low pass filter within the customer's premises therefore may involve the most amount of effort and is thus likely to be the least desirable location for the low pass filter.

A further difficulty in the placement of the low pass filter is that the customer or one with a minimal amount of training should preferably be capable of installing the low pass filter. Because ADSL relies upon existing telephone wires and does not require any additional digital lines, ADSL by its very nature can be easily incorporated into many households or businesses. To help minimize the number of obstacles to the provision of ADSL services, the low pass filter should be designed and located so that potential customers with little or no experience in working with electrical lines or circuits can install the low pass filter. This goal of simplifying the installation of the low pass filter may be difficult to achieve given the minimal amount of space within the NID 32 and the level of expertise needed to splice the low pass filter external to the NID 32.

SUMMARY OF THE INVENTION

The present invention solves the problems described above by providing a line isolation device (LID) which filters the POTS signals for all POTS terminal devices within a customer's premises. The LID includes a low pass filter that has a relatively flat response over the voiceband yet provides sufficient attenuation for the higher band ADSL signals. Although a three-pole filter may be adequate, the low pass filter preferably is a four-pole filter which provides 30 dB of attenuation at frequencies above 15 kHz.

The LID, in one embodiment, is encased within a sealed enclosure that can be located either internal or external to a network interface device (NID). The LID is added to the customer's telephone network by disconnecting a testing jack within the NID and adding the LID in series between the two connectors forming the testing jack. The LID receives POTS signals and ADSL signals from one connector of the testing jack and provides filtered POTS signals to the connector of the testing jack that supplies the filtered POTS signals to a POTS interconnect wire. A bypass line within the LID carries the unfiltered POTS signals and the ADSL signals to an ADSL interconnect wire so that the ADSL signals can be carried to an ADSL transceiver unit. The LID conveniently has connectors that mate with the connectors of the testing jack whereby the LID can be easily and quickly added to the customer's telephone network with minimal effort.

In a second embodiment, the LID is integrated onto the body of a customer bridge, such as underneath the customer bridge. The low pass filter within the LID supplies filtered POTS signals to a testing jack on the customer bridge whereas the unfiltered POTS signals and the ADSL signals are routed over a bypass line to the ADSL interconnect wire. The customer bridge having the integral LID can quickly and easily replace an existing customer bridge and provide the necessary filtering for the POTS terminal devices. Since the LID is placed underneath the customer bridge, the LID can be easily accommodated within the tight confines of the NID.

In a third embodiment of the invention, the LID is incorporated onto a customer bridge, such as on an upper surface of the customer bridge. The customer bridge with the integral LID is placed within an empty receptacle within the NID, interconnects with the testing jack on an existing customer bridge, and provides the necessary low pass filtering of the POTS signals. The filtered POTS signals are supplied from the customer bridge modified to have the integral LID to the existing customer bridge and the POTS interconnect wire carries the filtered POTS signals to all POTS terminal devices within the customer's premises. The ADSL signals, on the other hand, are not routed over to the existing customer bridge but rather are preferably carried over a bypass line from the LID to the ADSL interconnect wire. Since the existing customer bridge can be left intact within the NID and since the POTS interconnect wire does not have to be removed, the modified customer bridge having the low pass filter can be easily and quickly added to the customer's telephone network.

Accordingly, it is an object of the present invention to provide a line isolation device that provides low pass filtering for all POTS terminal devices within a customer's premises.

It is another object of the present invention to provide a line isolation device that can be conveniently located within an existing network interface device.

It is a further object of the present invention to provide a line isolation device that can be easily and quickly installed.

It is a yet another object of the present invention to provide a customer bridge that has a line isolation device attached to its body.

It is a yet a further object of the present invention to provide a customer bridge having an integral line isolation device which can replace an existing customer bridge to provide filtering of all POTS signals.

It is a also an object of the present invention to provide a customer bridge having a low pass filter which can be inserted into an empty receptacle within a network interface device and interconnect with an existing customer bridge to provide filtering of all POTS signals.

BRIEF DESCRIPTION OF THE DRAWINGS

The accompanying drawings, which are incorporated in and form a part of the specification, illustrate preferred embodiments of the present invention and, together with the description, serve to explain the principles of the invention. In the drawings:

FIG. 2B is an enlarged partial view of a customer bridge and its receptacle within the network interface device of FIG. 2A;

FIG. 3 is front internal view of a network interface device and an ADSL line isolation device according to a preferred embodiment of the invention;

DETAILED DESCRIPTION

Figure 1:
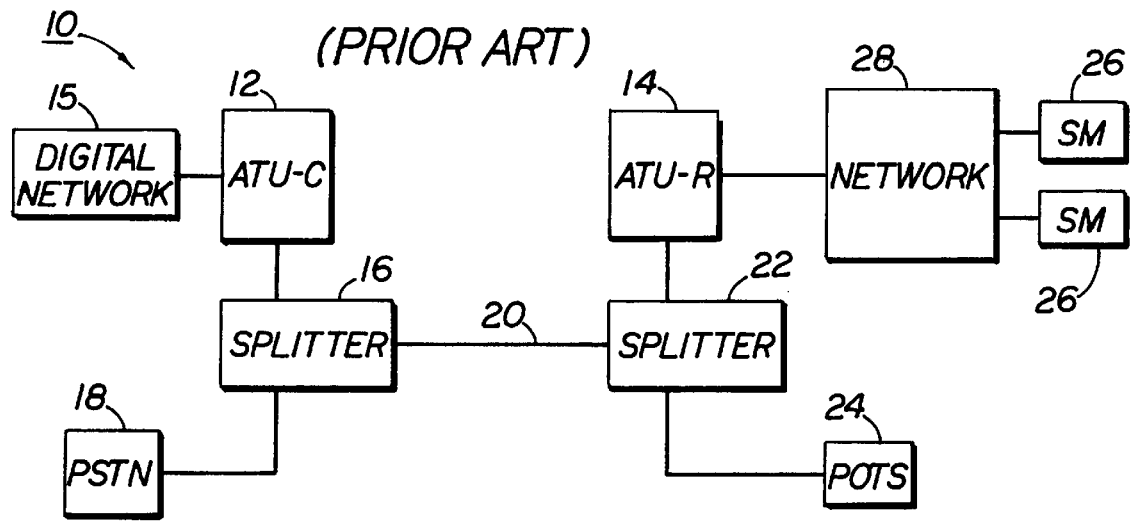
FIG. 1 is a block diagram of a typical ADSL system.

Reference will now be made in detail to embodiments of the invention, including preferred embodiments of the invention, non-limiting examples of which are illustrated in the accompanying drawings. With reference to FIG. 3, a customer installation according to a preferred embodiment of the invention includes the network interface device (NID) 32 and customer bridge 42. As with the conventional installation shown in FIG. 2A, the NID 32 has the station protector 38 for coupling with the incoming service wires 34 and the ground wire 36. The leads 40 from the customer bridge 42 carry tip and ring signals from the station protector 38 to the RJ11 female connector 44 of the customer bridge 42.

Figure 2A:
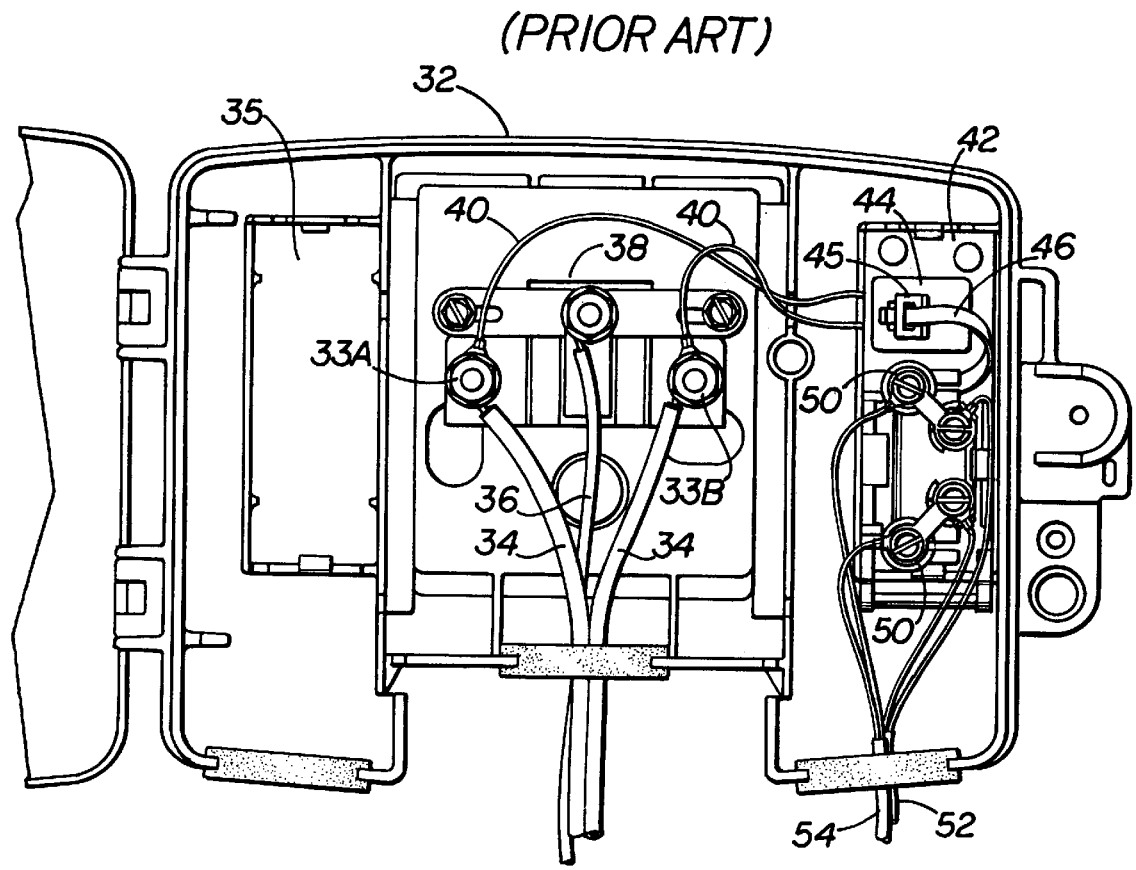
FIG. 2A is a front internal view of a network interface device conventionally wired for ADSL.

In contrast to the installation of FIG. 2A, the RJ11 female connector 44 is connected to an RJ11 male connector 68 rather than to the RJ11 male connector 45. The RJ11 male connector 68 is connected to a cord 66 which supplies both the POTS signals and the ADSL signals to an ADSL Line Isolation Device (LID) 70. The LID 70, as will be described in more detail below, includes a low pass filter for the POTS signals and also provides a bypass line 75 for the ADSL signals. The bypass line 75 preferably terminates in a jack 53 and provides an interconnect point for the interconnect wire 52 whereby ADSL signals can be carried to and from the ADSL transceiver unit 14. Preferably, the jack 53 is color-coded and has punch-down connectors 77 for interconnecting shielded wires of the ADSL interconnect wire 52 to the individual wires of the bypass line 75. The filtered POTS signals from the low pass filter within LID 70 are routed over cord 64 to an RJ11 female connector 62. The existing RJ11 male connector 45 is connected to the RJ11 female connector 62 and routes the filtered POTS signals over cord 46 to the binding posts 50. The POTS interconnect wire 54 is connected to these binding posts 50 and supplies the filtered POTS signals to the POTS terminal devices 24 located within the customer's premises.

As is apparent from FIG. 3, the low pass filter within the ADSL LID 70 can be easily added to an existing ADSL installation having a customer bridge 42, such as the one shown in FIG. 2A. The customer bridge 42 need not be removed and the interconnect wire 54 for POTS signals need not be removed from the binding posts 50. Rather, the RJ11 male connector 45 is disconnected from the RJ11 female connector 44, the additional RJ11 female connector 62 is connected to the RJ11 male connector 45, and the additional RJ11 male connector 68 is connected to the RJ11 female connector 44. The RJ11 connectors 62 and 68 and the extra cords 64 and 66 consume only a nominal amount of space and can easily be accommodated within most NIDs, as is apparent with NID 32. The modification to an existing ADSL installation, such as the one in FIG. 2A, to have a single low pass filter does not require splicing any components together and can therefore be performed by someone having little guidance or expertise.

The LID 70 is located external to the NID 32 and provides appropriate shielding for the low pass filter within the LID 70 and for the cables and wires traveling between the LID 70 and the NID 32. The exact location of the LID 70 relative to the NID 32 is not critical but can conveniently be mounted in close proximity to the NID 32, such as to the same exterior wall of the customer's premises where the NID 32 is mounted. The LID 70, however, need not be located external to the NID 32 but can be conveniently located internal the NID 32. If the LID 70 is mounted internal to the NID 32, the size of the LID 70 can be reduced significantly since the low pass filter can rely upon the protection afforded by the NID 32 and need not be encased within a separate housing. The LID 70, for instance, may be located within the NID 32 near the customer bridge 42 or in an empty receptacle 35 reserved for a second customer bridge. The LID 70 could also be mounted within the customer's premises and may be located near or within the ADSL transceiver unit 14. Other locations for the ADSL LID 70 will be apparent to those skilled in the art.

Figure 4:
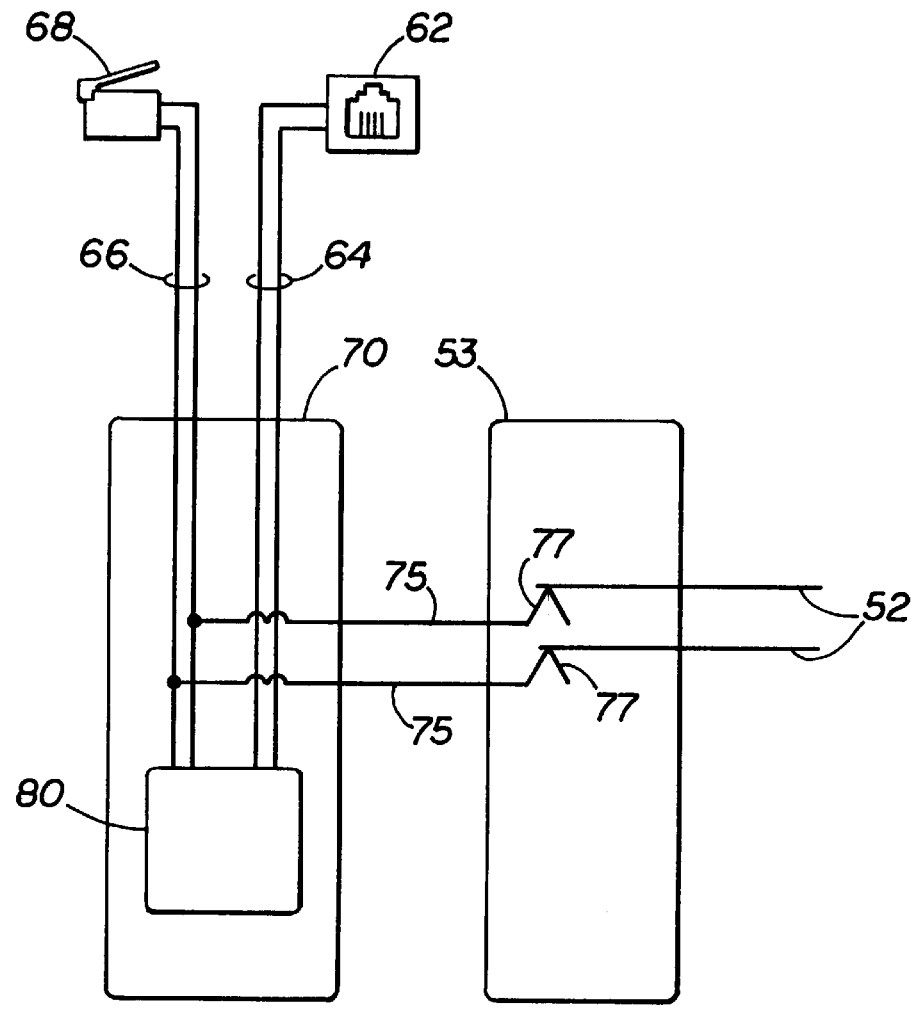
FIG. 4 is a schematic view of an ADSL Line Isolation Device according to a preferred embodiment of the invention.

The LID 70, as shown in more detail in FIG. 4, has a low pass filter 80 for providing the low pass filtering of the POTS signals for all POTS terminal devices 24. The low pass filter 80 has its input connected to the cord 66 carrying both the POTS signals and the ADSL signals and its output connected to the cord 64 carrying the filtered POTS signals. The bypass line 75 supplies all of the incoming signals, the POTS signals and the ADSL signals, to the jack 53 where the ADSL interconnect wire 52 is connected. Although each of the cords 64 and 66 are shown as a single line, it should be understood that the cords 64 and 66 actually consist of twisted pairs of conductors and have been illustrated as a single line to simplify the drawings.

With the LID 70, all incoming ADSL signals and POTS signals are supplied over cord 66 to the low pass filter 80. The low pass filter 80 filters the incoming signals by removing the ADSL signals and outputs the filtered POTS signals over cord 64 to RJ11 female connector 62 and eventually to the POTS interconnect wire 52. The ADSL signals, along with the POTS signals, are routed over bypass line 75 to the ADSL interconnect wire 52 via jack 53. The ADSL interconnect wire 52 therefore carries both the ADSL signals and the POTS signals to the ADSL transceiver unit 14. A high pass filter may be located at the ADSL transceiver unit 14 to filter out the POTS signals and to only supply the ADSL signals to the ADSL transceiver unit 14. This high pass filter may be a separate device that is placed in series between the ADSL transceiver unit 14 and the ADSL interconnect wire 52 or may be integral to the ADSL transceiver unit 14.

In general, the low pass filter 80 must sufficiently attenuate ADSL signals while passing through all POTS signals. To determine the amount of attenuation that the filter 80 must provide, an ADSL transceiver 14, such as one manufactured by Westell Technologies, Inc., was bridged across a pair of 500-type telephone sets along with a network simulator and the amount of intermodulation products was measured by a transmission measurement set. With a 13 dBm ADSL signal, the transmission measurement set indicated that a value of about −39 dBm of noise power was introduced into the voice band. This noise level was found to be fairly independent of the loop current level or switched status of the telephone sets. The ADSL to voiceband conversion loss was therefore determined to be approximately 52 dB.

The measurements of the noise level was performed in accordance with IEEE Standard 743 relating to the measurement of transmission characteristics of analog voice frequency circuits. The noise level was C-message weighted whereby the noise was weighted according to its perceived annoyance to a typical listener of standard telephone services. The −39 dBm of noise introduced by the ADSL transceiver corresponds to about 50 dB relative noise C-message weighting (dBrnC). To lower the noise level in the voice band to an acceptable limit of 20 dBrnC, approximately 30 dB of attenuation is needed by the filter 80.

Figure 5:
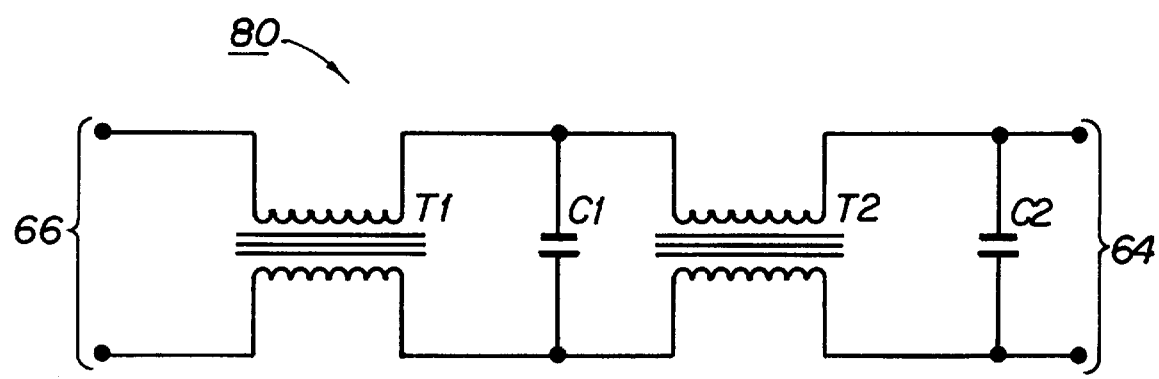
FIG. 5 is a circuit schematic of a low-pass filter according to a preferred embodiment of the invention.

The filter 80 preferably comprises a four-pole filter which provides a low loss at the high end of voiceband and provides about 30 dB of attenuation for frequencies at and above 15 kHz. Although a three-pole filter may provide a sufficient amount of roll-off above 15 kHz, the four-pole filter is preferred since it presents a high bridging impedance to the ADSL line. The filter 80, as shown in more detail in FIG. 5, includes a first transformer T1, a first capacitor C1, a second transformer T2, and a second capacitor C2. The first transformer T1 receives the incoming ADSL signals and POTS signals over cord 66 and has an inductance of 14.6 $\mu$H. The first capacitance C1, having a capacitance of 0.098 $\mu$F, is connected across an output from the first transformer T1. The second transformer T2, which has its inputs connected to the output from the first transformer T1, has an inductance of 35.3 mH. The second capacitance C2, which has a capacitance of 0.041 $\mu$F, is connected across an output from the second transformer T2 and provides filtered POTS signals to cord 64.

Figure 6:
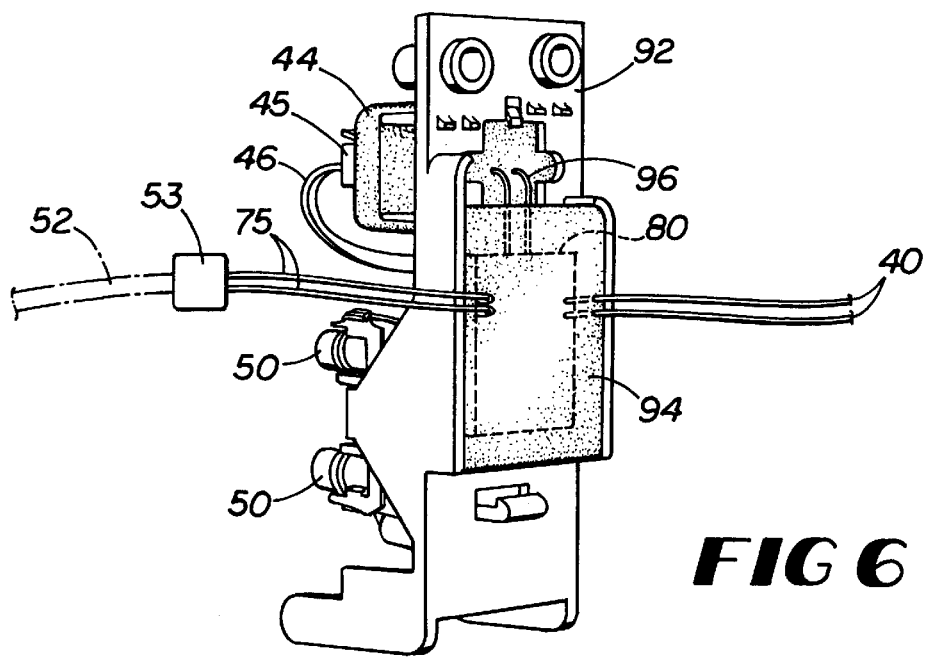
FIG. 6 is a rear perspective view of a customer bridge and ADSL line isolation device according to a second embodiment of the invention.

In a second embodiment of the invention, as shown in FIG. 6, the low pass filter 80 is mounted to a customer bridge 92 and is preferably mounted to an underside of the customer bridge 92 within potting 94. The leads 40 from the station protector 38 are not supplied directly to the RJ11 female connector 44 but rather are connected to the low pass filter 80. The low pass filter 80, as described above with reference to FIG. 4, provides low pass filtering of the POTS signals for all of the POTS terminal devices 24 located within the customer's premises. The filtered POTS signals are then routed from the low pass filter 80 over leads 96 to the RJ11 female connector 44. As with the typical customer bridge 42, the cord 46 extends between the RJ11 male connector 45 and the binding posts 50 and supplies the filtered POTS signals to the binding posts 50. The POTS interconnect wire 54 can then be connected to the posts 50 in order to provide POTS signals to all of the POTS terminal devices 24 within the premises.

In contrast to the typical customer bridge 42, the customer bridge 92 shown in FIG. 6 also has the bypass line 75 exiting from the low pass filter 80. The bypass line 75 terminates in the jack 53 and carries the ADSL signals to the ADSL interconnect wire 52. The ADSL transceiver unit 14, which receives the ADSL signals and unfiltered POTS signals from over ADSL interconnect wire 52, may contain a high pass filter to remove the POTS signals or, alternatively, a separate high pass filter may be added in series between the ADSL transceiver unit 14 and the ADSL interconnect wire 52 in order to remove the POTS signals.

The customer bridge 92 is intended to replace the customer bridge 42 found within the typical customer installation of FIG. 2A and may be quickly and easily performed by a telephone company's technician. To equip a customer's premises with ADSL capability, the technician simply removes the existing customer bridge 42 and replaces it with the customer bridge 92. The POTS interconnect wire 54 is connected to the binding post 50 as in the typical installation and the ADSL interconnect wire 52 are inserted into jack 53. The technician and the customer need not worry about protecting the filter 80 from the environment since it is encased within the NID 32. Further, by mounting the filter 80 underneath the customer bridge 92, the filter 80 fits within an unused area within the receptacle 35 and can easily fit within most NIDs.

Figure 7:
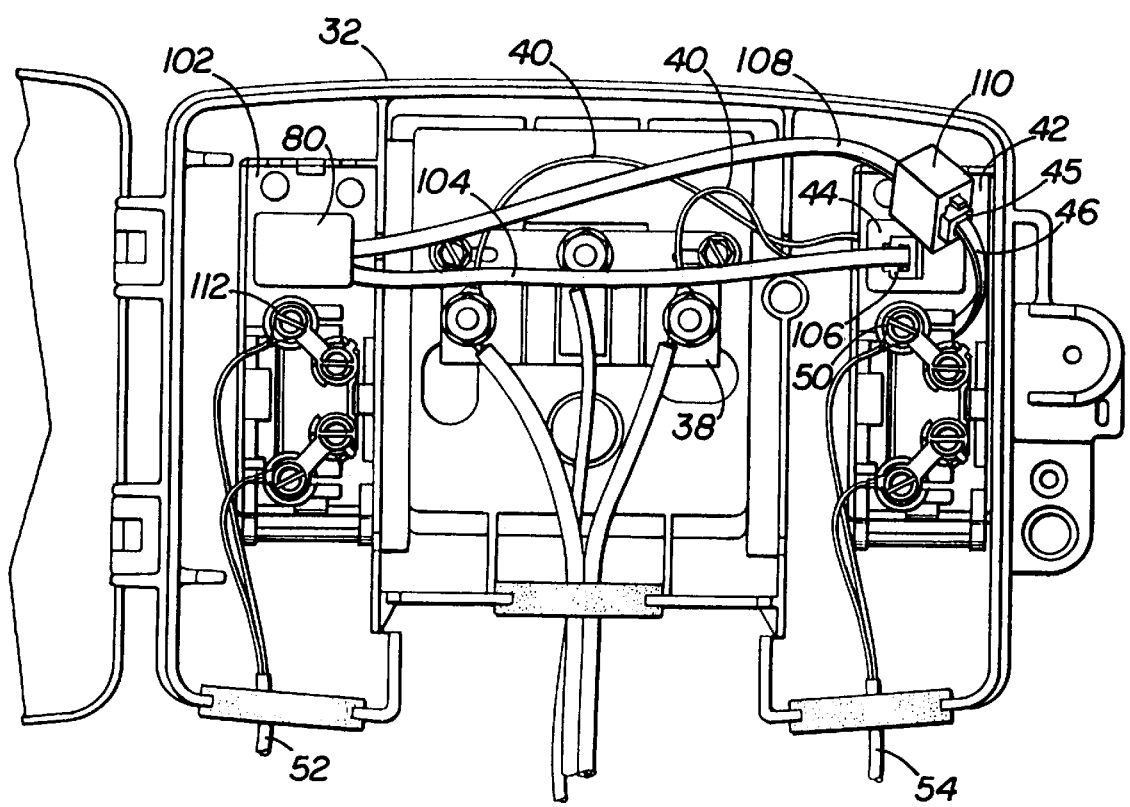
FIG. 7 is a front internal view of a network interface device and an ADSL line isolation device according to a third embodiment of the invention.

A customer installation according to a third embodiment is shown in FIG. 7. This installation includes the customer bridge 42 which receives the ADSL and POTS signals over leads 40 from the station protector 38. As with the installation in FIG. 2A, the ADSL and POTS signals are supplied to the RJ11 female connector 44 mounted on the customer bridge 42. The installation in FIG. 7 also includes a customer bridge 102 secured to an open receptacle 35 in the NID 32. The customer bridge 102 has a cord 104 and an RJ11 male connector 106 for carrying the POTS and ADSL signals from the RJ11 female connector 44 to the filter 80. Although the filter 80 is shown on a top surface of the customer bridge 102, the filter 80 may alternatively be located underneath the customer bridge 102 in a manner similar to that shown in FIG. 6. The filtered POTS signals output from the filter 80 are carried over cord 108 to RJ11 female connector 110 and to RJ11 male connector 45 through its connection with the RJ11 female connector 110. From the RJ11 male connector 45, the filtered POTS signals are routed to the binding posts 50 and then to the POTS interconnect wire 54. The bypass line 75 carrying the unfiltered POTS signals and the ADSL signals are routed to the binding posts 112 on the customer bridge 102. The bypass lines 75 are preferably routed underneath the customer bridge 102 to the binding posts 1 12, although the lines 75 may be placed at other locations. The ADSL interconnect wire 52 is then connected to the binding posts 112 to carry the ADSL signals to and from the ADSL transceiver 14.

With the installation shown in FIG. 7, the existing customer bridge 42 can remain in place and need not be removed in order to filter the POTS signals for all POTS terminal devices 24. In those NIDs that are equipped with extra receptacles, the customer bridge 102 having the low pass filter 80 can be easily and quickly placed into an empty receptacle. After the customer bridge 102 has been installed within the NID 32, the RJ11 connectors 44 and 45 are disconnected, the RJ11 male connector 106 is connected to the RJ11 female connector 44, the RJ11 male connector 45 is connected to the RJ11 female connector, and the interconnect wire 52 is then attached to the binding posts 112. The installation in FIG. 7 does not require any unit to be installed external to the NID 32, in contrast to the LID 70 in FIG. 3, but instead places the filter 80 within the NID 32. As will be appreciated to those skilled in the art, the cords 104 and 108 should be long enough so that they may be moved toward one side of the NID 32 to permit the opening and closing of a cover over the station protector 38.

The forgoing description of the preferred embodiments of the invention has been presented only for the purpose of illustration and description and is not intended to be exhaustive or to limit the invention to the precise forms disclosed. Many modifications and variations are possible in light of the above teaching.

For example, the NID 32 shown in FIGS. 2A and 2B represents a Siecor Corporation ONI 200 network interface device. The invention, however, is not limited to this particular type of NID but may be embodied in other network interface devices. Further, the invention is not limited to just RJ11 connectors but may be used with other types of connectors. Additionally, although the high pass filter has been described as being located near or integral with the ADSL transceiver unit 14, the high pass filter may be placed in other locations. For instance, the high pass filter may be placed within the NID 32 between bypass line 75 and connector 77. In such a location, the high pass filter can provide filtering for all ADSL devices within the customer's premises and can be conveniently located within the LID 70 along with the low pass filter.

Also, the invention can be incorporated into any NID having a testing jack. For instance, if a NID does not have a customer bridge 42 but does include a testing jack, such as the jack defined by connectors 44 and 45, the customer bridge 102 may nonetheless introduce a low pass filter 80 capable of filtering the POTS signals for all POTS terminal devices within a customer's premises.

The embodiments were chosen and described in order to explain the principles of the invention and their practical application so as to enable others skilled in the art to utilize the invention and various embodiments and with various modifications as are suited to the particular use contemplated. It is intended that the scope of the invention only be limited by the claims appended hereto.

What is claimed is:

1. A line isolation device for use with a network interface device having a customer bridge wherein the customer bridge has a testing jack defined by a primary connector and a secondary connector and wherein signals travel to a customer's premises from the primary connector to the secondary connector, the line isolation device comprising:
   a low pass filter for receiving asymmetrical digital subscriber line (ADSL) signals and plain old telephone service (POTS) signals, for removing the ADSL signals, and for passing through filtered POTS signals;
   a first connector for mating with the primary connector of the testing jack wherein the primary connector is for receiving the POTS signals and the ADSL signals;
   a first conductor for carrying the POTS signals and the ADSL signals from the first connector to an input of the low pass filter;
   a second conductor for carrying the filtered POTS signals from an output of the low pass filter to the secondary connector of the testing jack; and
   a bypass conductor, connected to the first conductor, for carrying the POTS signals and the ADSL signals toward an ADSL interconnect line;

wherein the low pass filter provides filtered POTS signals for use by all POTS terminal devices within the customer's premises and the bypass conductor carries the ADSL signals for use by an ADSL transceiver unit.

2. The line isolation device as set forth in claim 1, wherein the low pass filter comprises a four-pole filter.

3. The line isolation device as set forth in claim 1, wherein the low pass filter provides at least 30 dB of attenuation at frequencies at and above 15 kHz.

4. The line isolation device as set forth in claim 1, wherein the first connector comprises an RJ11 male connector and the second connector comprises an RJ11 female connector.

5. The line isolation device as set forth in claim 1, further comprising an ADSL connector placed at an end of the bypass line for coupling the bypass line to the ADSL interconnect line.

6. The line isolation device as set forth in claim 5, wherein the ADSL connector comprises a jack having punch down connectors for receiving the ADSL interconnect line.

7. The line isolation device as set forth in claim 5, wherein the ADSL connector comprises a pair of binding posts for receiving the ADSL interconnect line.

8. The line isolation device as set forth in claim 1, further comprising an enclosure for encasing the low pass filter and wherein the enclosure is positioned external to the network interface device.

9. The line isolation device as set forth in claim 1, wherein the low pass filter is positioned within the network interface device.

10. The line isolation device as set forth in claim 1, wherein the low pass filter is secured to the customer bridge.

11. The line isolation device as set forth in claim 10, wherein the low pass filter is secured to a bottom surface of the customer bridge.

12. The line isolation device as set forth in claim 1, further comprising a second customer bridge for being secured within the network interface device and wherein the low pass filter is attached to the second customer bridge.

13. The line isolation device as set forth in claim 12, wherein the low pass filter is secured to a top surface of the second customer bridge.

14. A customer bridge for use in a network interface device associated with a customer's premises, comprising:
a body for being secured within the network interface device;
a pair of leads for receiving asymmetrical digital subscriber line (ADSL) signals and plain old telephone service (POTS) signals from within the network interface device;
a low pass filter attached to the body and having an input connected to the pair of leads, the low pass filter for receiving the ADSL signals and the POTS signals, for removing the ADSL signals, and for passing through filtered POTS signals;
a bypass line for carrying the POTS signals and the ADSL signals carried over the pair of leads; and
a POTS connector for receiving the filtered POTS signals from the low pass filter and for passing the filtered POTS signals to a POTS interconnect line;
wherein the low pass filter provides the filtered POTS signals for all POTS terminal devices within the customer's premises and the bypass line carries the ADSL signals for use by an ADSL transceiver unit.

15. The customer bridge as set forth in claim 14, wherein the low pass filter is secured to a bottom surface of the body.

16. The customer bridge as set forth in claim 14, wherein the low pass filter comprises a four-pole filter.

17. The customer bridge as set forth in claim 14, wherein the POTS connector comprises binding posts for carrying the filtered POTS signals to a POTS interconnect line.

18. The customer bridge as set forth in claim 14, further comprising an ADSL connector attached to an end of the bypass line, the ADSL connector for carrying the ADSL signals to an ADSL interconnect line.

19. The customer bridge as set forth in claim 14, wherein the ADSL connector comprises an ADSL jack having punch down connectors for receiving an ADSL interconnect line.

20. The customer bridge as set forth in claim 14, further comprising a testing jack, a first conductor connected between an output of the low pass filter and the testing jack, and a second conductor connected between the testing jack and the POTS connector.

21. The customer bridge as set forth in claim 20, wherein the testing jack comprises an RJ11 female connector connected to the first conductor and an RJ11 male connector connected to the second conductor.

22. A customer bridge for use in a network interface device having a testing jack defined by a primary connector and a secondary connector and wherein signals travel to a customer's premises from the primary connector to the secondary connector, the customer bridge comprising:
a body for being secured within the network interface device;
a low pass filter, attached to the body, for receiving asymmetrical digital subscriber line (ADSL) signals and plain old telephone service (POTS) signals, for removing the ADSL signals, and for passing through filtered POTS signals;
a first connector for mating with the primary connector of the testing jack wherein the primary connector is for receiving the POTS signals and the ADSL signals;
a first conductor for carrying the POTS signals and the ADSL signals from the first connector to an input of the low pass filter;
a second conductor for carrying the filtered POTS signals from an output of the low pass filter to the secondary connector of the testing jack; and
a bypass conductor, connected to the first conductor, for carrying the POTS signals and the ADSL signals toward an ADSL interconnect line;
wherein the low pass filter provides the filtered POTS signals for all POTS terminal devices within the customer's premises and the bypass line carries the ADSL signals for use by an ADSL transceiver unit.

23. The customer bridge as set forth in claim 22, wherein the low pass filter is secured to an upper surface of the body.

24. The customer bridge as set forth in claim 22, wherein the body is sized to fit within a receptacle in the network interface device.

25. The customer bridge as set forth in claim 22, further comprising an ADSL connector attached to an end of the bypass line, the ADSL connector for coupling the ADSL signals from the bypass line to the ADSL interconnect line.

26. The customer bridge as set forth in claim 25, wherein the ADSL connector comprises binding posts secured to a top surface of the body.

27. The customer bridge as set forth in claim 22, wherein the first connector and the second connector comprise RJ11 male and female connectors, respectively.

* * * * *